(12) United States Patent
Kodama et al.

(10) Patent No.: US 8,159,532 B2
(45) Date of Patent: Apr. 17, 2012

(54) ELECTRONIC IMAGE PICKUP APPARATUS

(75) Inventors: Hiroshi Kodama, Hachioji (JP); Masahito Watanabe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 1062 days.

(21) Appl. No.: 12/077,994

(22) Filed: Mar. 21, 2008

(65) Prior Publication Data

US 2008/0231696 A1    Sep. 25, 2008

(30) Foreign Application Priority Data

Mar. 23, 2007   (JP) ................................. 2007-076727

(51) Int. Cl.
H04N 5/225   (2006.01)

(52) U.S. Cl. ............................ 348/81; 359/771; 359/753

(58) Field of Classification Search ...................... 348/81
See application file for complete search history.

(56) References Cited

FOREIGN PATENT DOCUMENTS

| CN | 1 659 592 | 8/2005 |
|---|---|---|
| JP | 06-250274 | 9/1994 |
| JP | 06250274 A * | 9/1994 |
| JP | 07-159689 | 6/1995 |
| JP | 11-252431 | 9/1999 |
| JP | 11252431 A * | 9/1999 |
| JP | 2004-252218 | 9/2004 |
| JP | 2004-252219 | 9/2004 |
| JP | 2005-328224 | 11/2005 |
| JP | 2005328224 A * | 11/2005 |
| JP | 2007-129388 | 5/2007 |
| WO | 03/107274 | 12/2003 |

OTHER PUBLICATIONS

English translation of Chinese Office Action, dated Sep. 9, 2010, issued in corresponding Chinese Patent Application No. 200810085846.4.

Japanese Office Action, dated Apr. 27, 2011, issued in corresponding Japanese Patent Application No. 2007-076727.

* cited by examiner

*Primary Examiner* — Tammy Nguyen
*Assistant Examiner* — Natisha Cox
(74) *Attorney, Agent, or Firm* — Kenyon & Kenyon LLP

(57) ABSTRACT

An electronic image pickup apparatus includes a zoom lens system which is a taking optical system, an electronic image pickup element which is disposed at an image side of the taking optical system (zoom lens system), and which converts an image formed by the taking optical system (zoom lens system) to an electric signal, and an image restoring section which restores electrically a photographed image according to a difference in occurrence of an aberration by the taking optical system (zoom lens system) in an air environment photography and in a underwater environment photography.

11 Claims, 13 Drawing Sheets

AT THE TIME OF
ON-LAND PHOTOGRAPHY
(WIDE ANGLE END)

OPTICAL SYSTEM
ABERRATION

IMAGE
CORRECTION →

AT THE TIME OF
UNDERWATER PHOTOGRAPHY
(WIDE ANGLE END)

OPTICAL SYSTEM
ABERRATION

IMAGE
CORRECTION →

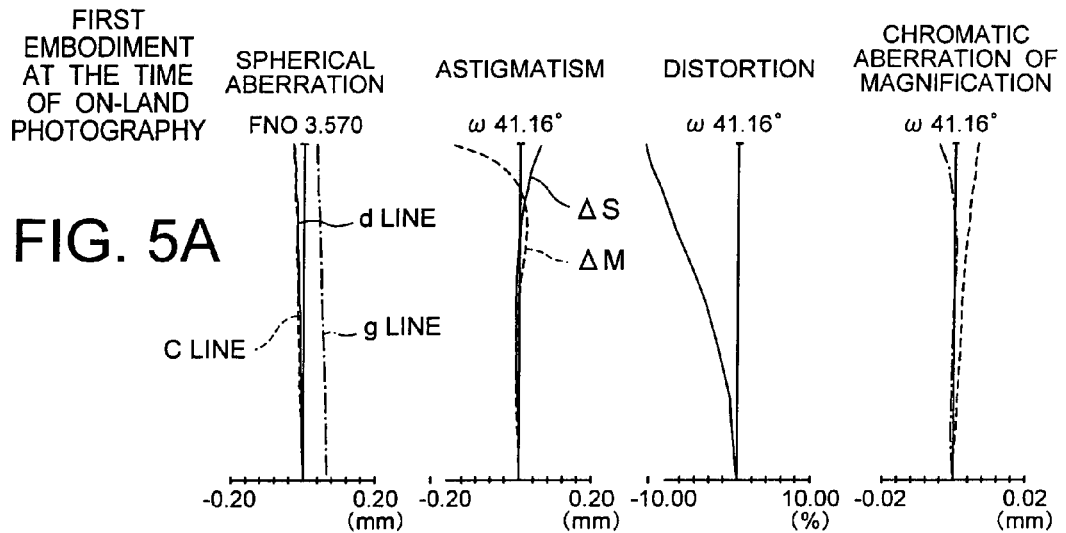
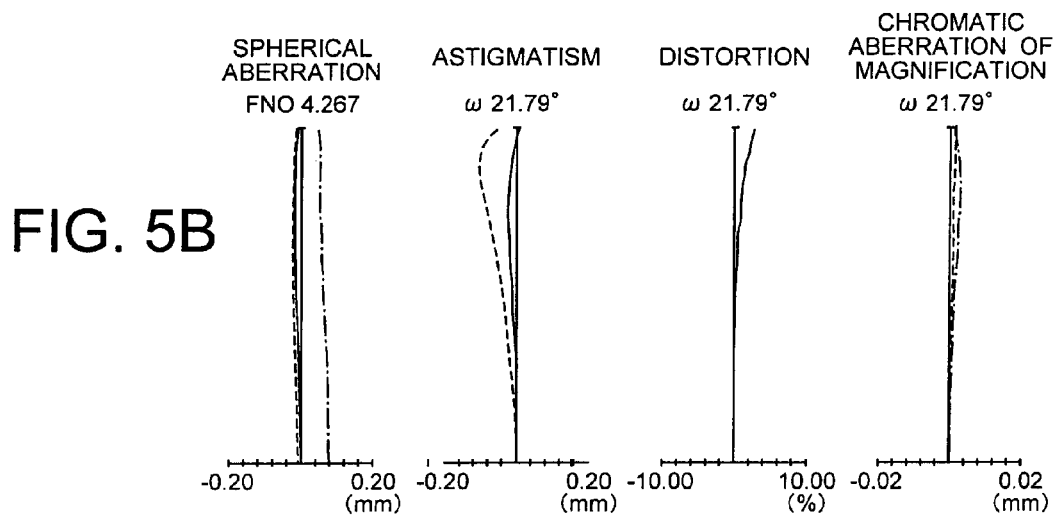
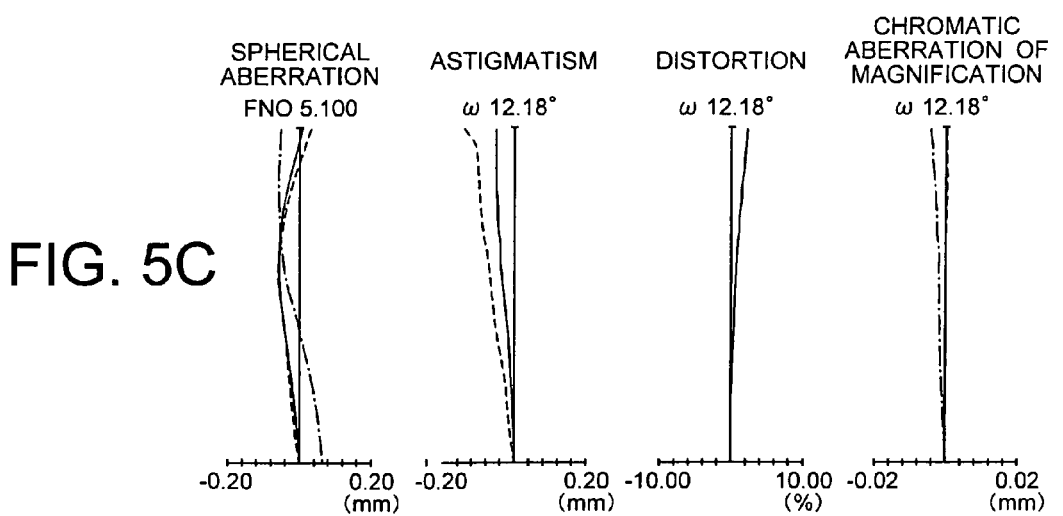

FIRST EMBODIMENT AT THE TIME OF UNDERWATER PHOTOGRAPHY

SECOND EMBODIMENT AT THE TIME OF ON-LAND PHOTOGRAPHY

SECOND EMBODIMENT AT THE TIME OF UNDERWATER PHOTOGRAPHY

ELECTRONIC IMAGE PICKUP APPARATUS

CROSS-REFERENCE TO RELATED APPLICATION

The present application is based upon and claims the benefit of priority from the prior Japanese Patent Application No. 2007-076727 filed on Mar. 23, 2007; the entire contents of which are incorporated herein by reference.

BACKGROUND OF THE INVENTION

1. Field of the Invention

The present invention relates to an image pickup apparatus which is capable of normal photography (picture taking) in air, and a photography in water.

2. Description of the Related Art

Even in an optical system in which a distortion is corrected favorably in a taking optical system on the land, when an underwater housing having a plane parallel plate in an entrance window is mounted, and an attempt is made to take a picture under water, a pin-cushion distortion occurs. This is because a refractive index of air is approximately 1.00 and a refractive index of water is approximately 1.33306.

A graph shown in FIG. 12 is a graph which shows a relationship between a half-image angle of incidence in water, and an amount of distortion occurred, when light subjected to corrected distortion is incident on a taking optical system via the entrance window in the form of a plane parallel plate, in the water. A vertical axis shows the half-image angle of incidence (degrees) and a horizontal axis shows the amount of distortion (%) which occurs. It is revealed that as the image angle becomes large, the pin-cushion distortion becomes remarkable.

On the other hand, when the entrance window toward (in) the underwater housing side is made to be dome shaped, and when each main light ray is let to be incident substantially vertically with respect to the entrance window, a taking with distortion is suppressed. However, in this case, the entrance window and a water medium together act as a concave lens, and a field curvature occurs. Moreover, a manufacturing cost of the dome-shaped entrance window becomes high.

Moreover, when a chromatic aberration of magnification is corrected favorably on land, in underwater photography through the plane parallel plate, due to an effect of dispersion of water, (Abbe's number is approximately 62), a chromatic aberration of magnification of a short wavelength occurs in a positive direction (a direction going away from a center of a picture plane). On the other hand, the chromatic aberration of magnification of a long wavelength occurs in a negative direction (a direction approaching the center of the picture plane), and a color spreading is susceptible to occur.

Inventions which compensate an aberration change at the time of underwater photography are disclosed in Japanese Patent Application Laid-open Publication Nos. Hei 7-159689 and 2004-252219. An invention in which a lens member and a diffraction filter are added so as to correct the chromatic aberration of magnification or the distortion which occurs during the underwater photography has been disclosed in Japanese Patent Application Laid-open Publication No. Hei 7-159689. Moreover, an idea of correcting the chromatic aberration by using a diffraction surface in the entrance window of the underwater housing has been disclosed in Japanese Patent Application Laid-open Publication No. 2004-252219.

SUMMARY OF THE INVENTION

An electronic image pickup apparatus of the present invention includes a taking optical system, an image pickup element which is disposed at an image side of the taking optical system, and which converts an image formed by the taking optical system to an electric signal, and an image restoring section which restores electrically a photographed image according to a difference in occurrence of an aberration by the taking optical system in an air environment photography and in a underwater environment photography.

BRIEF DESCRIPTION OF THE DRAWINGS

FIG. 4A shows a state at a wide angle end, FIG. 4B shows an intermediate zoom state defined in the present invention, and FIG. 4C shows a state at a telephoto end;

FIG. 5A, FIG. 5B, and FIG. 5C are diagrams showing a spherical aberration, an astigmatism, a distortion, and a chromatic aberration of magnification at the time of the infinite object point focusing, at the time of on-land photography of the first embodiment, where, FIG. 5A shows the state at the wide angle end, FIG. 5B shows the intermediate zoom state, and FIG. 5C shows the state at the telephoto end;

FIG. 6A shows the state at the wide angle end, FIG. 6B shows the intermediate zoom state, and FIG. 6C shows the state at the telephoto end;

FIG. 8A shows the state at the wide angle end, FIG. 8B shows the intermediate zoom state defined in the present invention, and FIG. 8C shows the state at the telephoto end;

FIG. 9A shows the state at the wide angle end, FIG. 9B shows the intermediate zoom state defined in the present invention, and FIG. 9C shows the state at the telephoto end;

FIG. 10A shows the state at the wide angle end, FIG. 10B shows the intermediate zoom state, and FIG. 10C shows the state at the telephoto end;

FIG. 11A shows the state at the wide angle end, FIG. 11B shows the intermediate zoom state, and FIG. 11C shows the state at the telephoto end;

DETAILED DESCRIPTION OF THE INVENTION

Figure 1A:
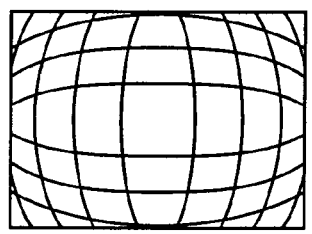
FIG. 1A, FIG. 1B, FIG. 1C, and FIG. 1D diagrams showing an outline of a restoration function in an image restoring section.

To solve the abovementioned issues and to achieve the object, according to the present invention, there is provided an electronic image pickup apparatus including a taking optical system, an image pickup element which is disposed at an image side of the taking optical system, and which converts an image formed by the taking optical system, to an electric signal, and an image restoring section which restores electrically a photographed image according to a difference in occurrence of an aberration by the taking optical system in an air environment photography and in a underwater environment photography.

Accordingly, an image restoration in which the difference in the occurrence of the aberration in the air environment photography and in the underwater environment photography has been taken into consideration is carried out. Consequently, new optical components are not required for the underwater photography, and the correction of aberration is carried out with a small size while keeping a cost low.

Moreover, according to a preferable aspect of the present invention, it is preferable that the aberration which is restored electrically is a distortion. In a case of a taking optical system which is capable of a wide angle photography in the on-land photography and the underwater photography, a change in the distortion is remarkable. Therefore, it is preferable to carry out the correction of the distortion by the electrical image restoration.

Moreover, according to a preferable aspect of the present invention, it is preferable that the aberration which is restored electrically is a chromatic aberration of magnification. There occurs to be a change in the chromatic aberration of magnification in the on-land photography and the underwater photography. Therefore, it is preferable to carry out the correction of the chromatic aberration of magnification by the electrical image restoration.

Moreover, according to a preferable aspect of the present invention, it is preferable that the electronic image pickup apparatus includes an operating section in which, a setting of as to whether the electronic image pickup apparatus is in an air environment or in a underwater environment is carried out. Accordingly, the image restoration is carried out according to the setting of the in the air environment or in the underwater environment.

Moreover, according to a preferable aspect of the present invention, it is preferable that the electronic image pickup apparatus includes a sensor which detects whether the electronic image pickup apparatus is in the air environment or in the underwater environment, and that the image restoration is carried out based on information from the sensor.

Accordingly, it is possible to omit a job of setting a environment in which the apparatus is used, by a user. Moreover, an arrangement may be such that the sensor carries out a pressure measurement, and when a certain pressure is crossed, the image restoration is carried out for the in underwater environment photography. Or, an arrangement may be such that when the sensor has detected a change in an electric current, or passing of electricity when comes in contact with a liquid, the image restoration is carried out for the in underwater environment photography. Or, an arrangement may be such that, the sensor detects a state of mounting of an underwater housing, and when the underwater housing is mounted, the image restoration is carried out for the in underwater environment photography.

According to a preferable aspect of the present invention, it is preferable that a barrel distortion occurs in the air environment, in the taking optical system, and an absolute value of an amount of distortion is higher than an amount of distortion in the underwater environment.

By making the barrel distortion occur at the time of the on-land photography, it is possible to reduce an occurrence of distortion at the time of the underwater photography. Moreover, by letting an occurrence of the absolute value of distortion to be substantial in the air environment, a deterioration of an image quality due to an image processing at the time of the underwater photography is suppressed. Moreover, by allowing the occurrence of the barrel distortion in the taking optical system, it becomes advantageous for reducing the number of lenses in the taking optical system, and advantageous for making the size further smaller. Moreover, in the electronic image pickup apparatus, an arrangement may be made such that a degree of electrical correction of the distortion and the chromatic aberration of magnification is variable according to a shape of an entrance window of the underwater housing. Accordingly, an electrical adjustment of the distortion and the chromatic aberration of magnification becomes possible for any of a flat shaped entrance window and a dome-shaped entrance window.

Moreover, according to a preferable aspect of the present invention, it is preferable that the electronic image pickup apparatus further includes an information holding section which has data for distortion correction of the taking optical system, and a circuit which makes a judgment of a degree of correction of the distortion, based on a signal of a taking photography state and the data.

Accordingly, the electrical correction of the distortion is carried out according to a change of the on-land photography and the underwater photography.

Moreover, according to a preferable aspect of the present invention, it is preferable that the taking optical system is a zoom lens system which satisfies the following conditional expression.

$$0.50 < Ih/f_w < 1.50 \tag{A}$$

$$-40\% < DIS < -12\% \tag{B}$$

where, $f_w$ denotes a focal length at the time of a wide angle end photography of the taking optical system, Ih denotes half of a diagonal length of an effective image pickup area, and DIS denotes an amount of distortion in the image height Ih at the wide angle end at the time of in air photography. A wavelength is let to be a d-line (587.56 nm).

When the taking optical system is a zoom lens system, at the maximum change in the distortion on land and underwater is at a wide angle end. Therefore, it is preferable that the abovementioned conditions (A) and (B) are satisfied at the wide angle end.

Condition (B) may be changed into following condition (B')

$$-40\% < DIS < -8\% \quad (B')$$

Making an arrangement such that a lower limit value is not lower than a lower limit value in conditional expression (A) becomes advantageous for securing an image angle at the time of the underwater photography. By making an arrangement such that an upper limit value is not higher than an upper limit value in conditional expression (A), it becomes easy to suppress an image angle to be moderate, to suppress the change in distortion at the time of the on-land photography and the underwater photography when the entrance window at the time of the underwater photography is let to be a plane parallel plate, and to suppress the deterioration of the image quality due to the image processing correction.

By making an arrangement such that a lower limit value is not lower than a lower limit value in conditional expression (B), it becomes easy to suppress the barrel distortion at the time of the on-land photography, and to suppress the deterioration of the image quality in a portion around a picture plane when the distortion is corrected by image processing. By making an arrangement such that an upper limit value is not higher than an upper limit value in conditional expression (B), it becomes easy to suppress an occurrence of the pin-cushion distortion at the time of the underwater photography. Or, it is possible to secure an appropriate barrel distortion, and it is advantageous for securing an expression of a natural perspective.

According to the present invention, it is possible to provide an electronic image pickup apparatus which is capable of recording an image upon suppressing an effect of an aberration which changes at the time of the on-land photography and at the time of the underwater photography, without using a special optical element.

Embodiments of the electronic image pickup apparatus according to the present invention will be described below by referring to the accompanying diagrams. However, the present invention is not restricted to the embodiments described below.

Firstly, an outline of a taking optical system which is used in the embodiments will be described below. The taking optical system of each embodiment which will be described later is a zoom lens system. A barrel distortion is caused to occur at the wide angle end, and an amount of distortion is let to be an amount in which the distortion is suppressed at the time of the underwater photography. The chromatic aberration of magnification is corrected favorably in any a zoom state at the time of the on-land photography.

Figure 1B:
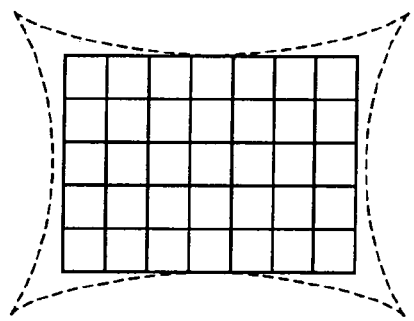
Figure 1C:
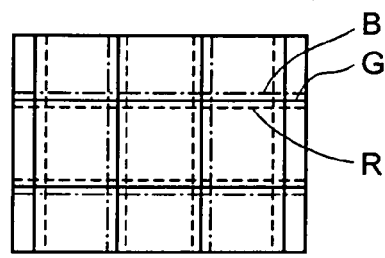
Figure 1D:
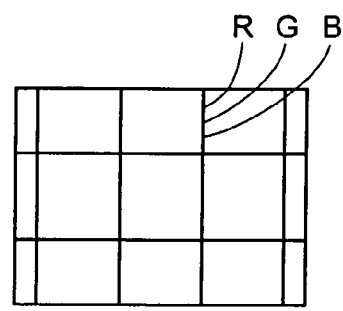

An outline of a restoration function in the image restoration section is shown in conceptual diagrams in FIG. 1A, FIG. 1B, FIG. 1C, and FIG. 1D. In FIG. 1A, FIG. 1B, FIG. 1C, and FIG. 1D, the aberration is shown to be exaggerated. As shown in FIG. 1A, and FIG. 1B, in the on-land photography (particularly wide angle end photography), a correction of mainly the distortion is carried out electrically. Moreover, as shown in FIG. 1C and FIG. 1D, at the time of the underwater photography, a correction of mainly the chromatic aberration of magnification is carried out electrically. As a matter of course, the other aberrations may be corrected electrically. In an area other than the wide angle end, the correction is carried out according to the amount of aberration that occurs.

For the correction of the chromatic aberration of magnification and the correction of the distortion by the image restoration, it is possible to use algorithm which has hitherto been known. For example, in image restoration correction software Adobe Photoshop (trademark), an adjustment of distortion of image for each of R (red), G (green), and B (blue) colors is carried out. As a matter of course, it is not necessary to carry out correction of such a high level.

Figure 13:
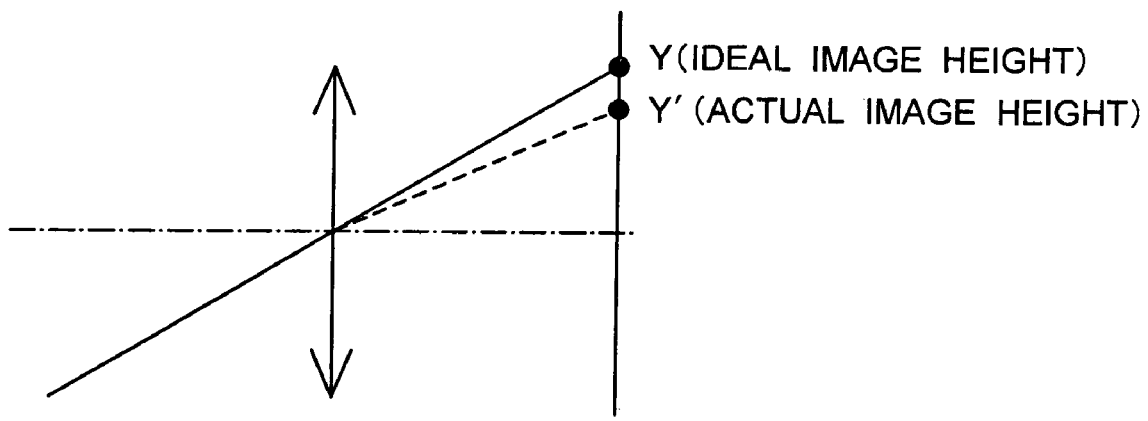
FIG. 13 is a diagram showing a relationship between an image height when there is no distortion, and an actual image height.

For example, in an explanatory diagram in FIG. 13, an image height when there is no distortion is let to be an ideal image height Y, and an actual image height is let to be an actual image height Y', and it is possible to make approximate an electrical correction value of distortion to the following expression for each of R, G, and B signals.

$Y' = Y + AY^3 + BY^5 + CY^7$ (A, B, and C are coefficients according to photography state).

The coefficients A, B, and C may be stored in a memory as coefficients which are changed according to factors such as an underwater and on-land state, a focal length, and an object-point distance. Coefficients of information which are not in the memory may be calculated based on coefficients in an approximate state.

Moreover, since it is possible to carry out a signal processing fast when the coefficients for the correction are reduced, the correction of the electric distortion may be simplified as $Y' = Y + AY^3$, and the number of multiplications may be reduced. Moreover, the correction of the chromatic aberration of magnification may be carried out simultaneously by carrying out the correction of distortion for each of the signals R, G, and B.

[First embodiment]

Figure 2:
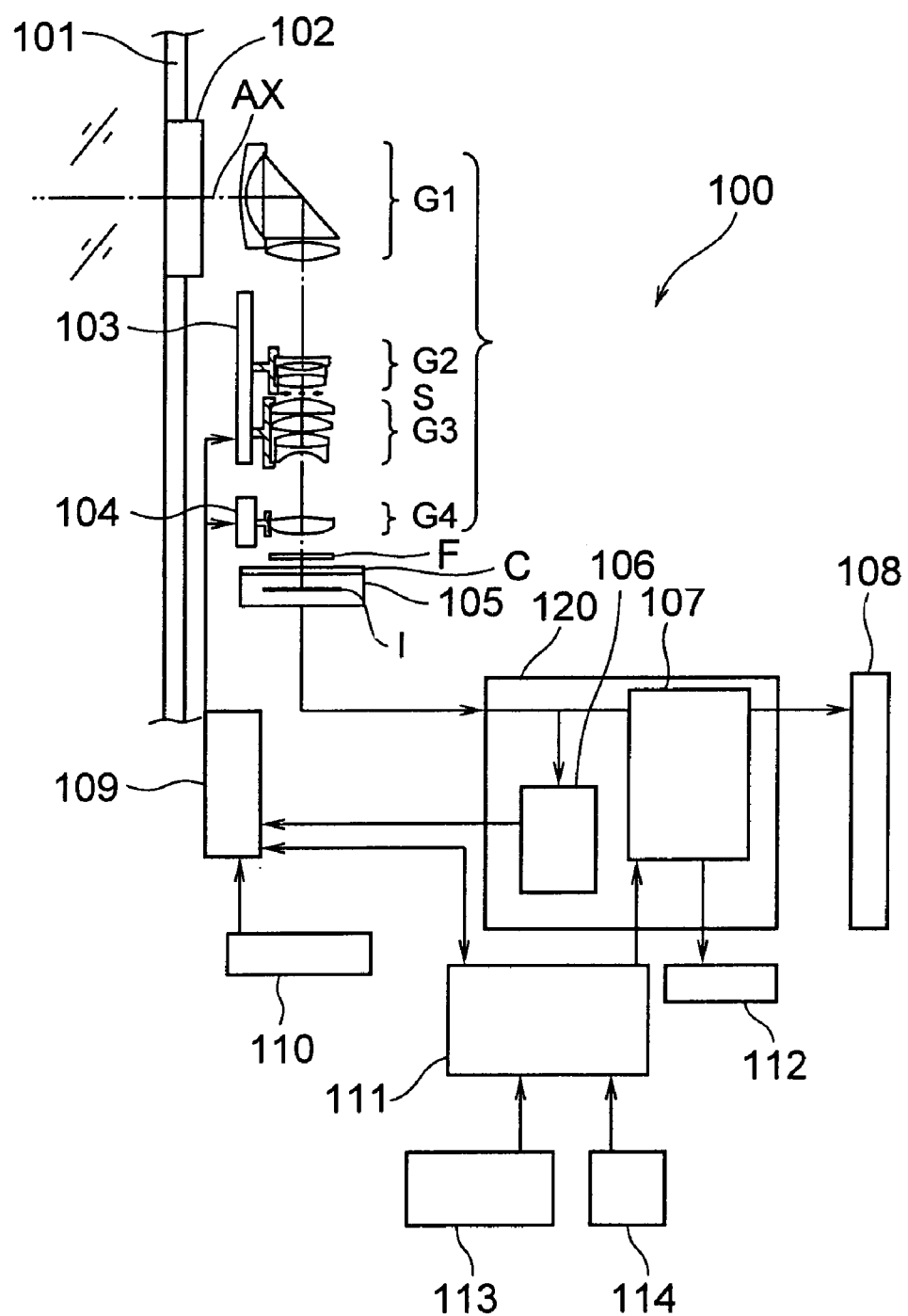
FIG. 2 is a diagram showing a schematic structure of a digital camera according to a first embodiment of the present invention.

FIG. 2 shows a schematic structure of a digital camera 100 which is an electronic image pickup apparatus according to a first embodiment of the present invention. A first lens unit G1, a second lens unit G2, a third lens unit G3, and a fourth lens unit G4 are lens units which form a zoom lens system which is a taking optical system. An aperture stop S which is integrated with an apparatus main body is disposed on an object side of the third lens unit G3.

Here, as the zoom lens system, a zoom lens system having a structure which will be described later is used. As a matter of course, other zoom lens system may also be used.

On a rear side of the zoom lens system, an electronic image pickup element 105 (may be a CCD (Charged Coupled Device) and a CMOS (Complementary Metal Oxide Semiconductor) in this case) and an optical filter F such as an infrared ray cutting filter and a low-pass filter are disposed. A cover glass C is disposed toward a surface of incidence of the CCD which is the electronic image pickup element 105. Light rays which have passed through the cover glass C are guided to an image pickup plane which is made of a plurality of light receiving elements.

The second lens unit G2, the third lens unit G3, and the fourth lens unit G4 in the zoom lens system move along direction of an optical axis AX by lens unit driving sections 103 and 104, and change a distance between the lens units, thereby carrying out zooming from the wide angle end to the telephoto end.

Although it is shown in a simplified form in the diagram, as a lens unit driving mechanism, it is possible to use a hitherto known mechanism such as a mechanism which is disposed around the lens unit, and which moves a lens unit by a helicoidal rotation, and a mechanism in which a screw hole is provided in a holding frame which holds a lens unit, and the lens unit is moved back and forth by rotating of a spiral screw pierced through the screw hole.

The structure is such that the fourth lens unit G4 carries out focusing from a long distance to a short distance by moving separately in the optical axis AX direction. An image is formed by the zoom lens system on an image pickup plane of the CCD.

An entrance window 102 made of a transparent plane parallel plate which is integrated with a main body exterior 101 of the digital camera 100 is provided on an object side of the zoom lens system. In the first embodiment, apart from the on-land photography, it is possible to carry out photography by taking a camera main body underwater, and specifications are for water proofing so that the water does not enter at the time of the underwater photography. At the time of the underwater photography, a medium on a side of the object, of the plane parallel plate at the time of the underwater photography is water.

Moreover, the structure may be let to be such that the underwater photography is carried out by loading the camera main body in an underwater housing. A plane parallel plate at a side of incidence of light in a second embodiment which will be described later is an entrance window of the underwater housing.

Figure 3:
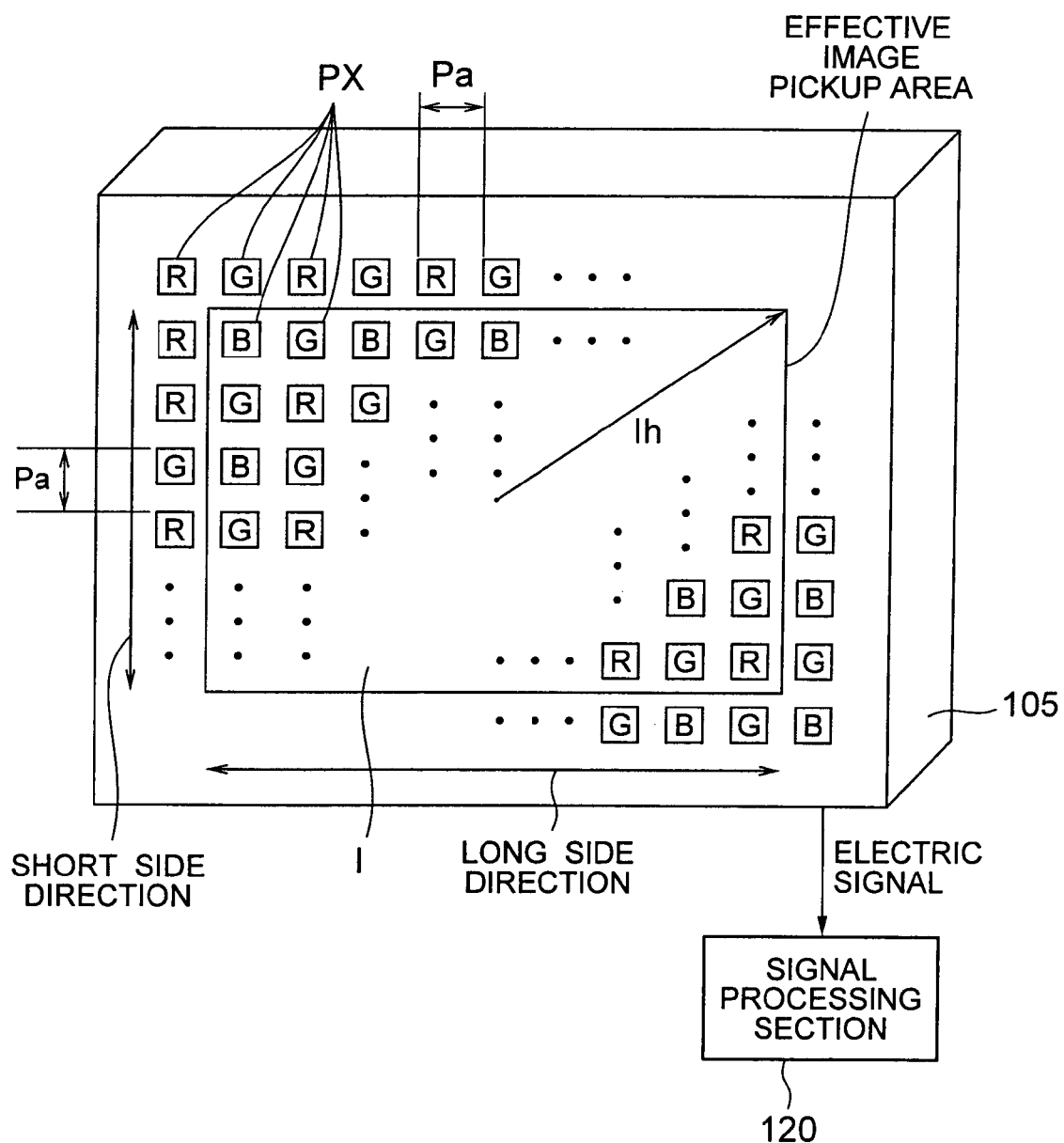
FIG. 3 is a diagram showing an example of a pixel arrangement of an electronic image pickup element.

The image pickup plane I is formed by a plurality of light receiving elements. Here, an effective image pickup area will be described below. FIG. 3 is a diagram showing an example of a pixel arrangement of the electronic image pickup element. Light receiving elements corresponding to R (red), G (green), and B (blue), or light receiving elements corresponding to four colors namely cyan, magenta, yellow, and green are arranged in a mosaic form at a pixel pitch Pa.

The effective image pickup area means an area in an image pickup plane on the electronic image pickup element using a reproduction (such as a display on a personal computer and a printing by a printer) of an image which is photographed. The effective image pickup area shown in the diagrams is adjusted to an image circle which may secure performance of the zoom lens system, and is set to be an area narrower than an area in which all the light receiving elements of the image pickup element are disposed.

In FIG. 3, Ih corresponds to half of a diagonal length of the effective image pickup area in the image pickup plane I. For instance, a simulated zooming may be carried out by changing the image pickup area, and an image pickup area which is used for reproduction of a projected image may be let to be variable in a different manner.

Moreover, usually, although a shape of the effective image pickup area is rectangular, in the present invention, the distortion by the zoom lens system is corrected by image processing. The shape of the effective image pickup area in this case is a shape which is close to a distortion due to the zoom lens system. This shape is changed according a state of the focal length of the zoom lens system, and image restoration is carried out electrically.

When the effective image pickup area changes in such manner, Ih in the present invention is defined as the maximum value among the possible values. An image which is photographed by this image pickup element 105 (such as a CCD and a CMOS), is converted to an electric signal which indicates an image, and is guided to a signal processing section 120.

In the signal processing section 120, a signal processing such as an image restoration, an image restoration according to a difference in a photography environment such as underwater, on-land, a contrast adjustment and a gamma correction based on the signal of the image which is photographed by the electronic image pickup element 105, are carried out, and an image signal subjected to the image restoration is generated.

Moreover, a contrast detecting section 106 reads a change in the contrast of the image due to a movement of the fourth lens unit G4, and detects a contrast within a focusing area. Further, the contrast detecting section 106 moves the fourth lens unit G4 to a position at which the contrast is maximum, and a signal which carries out a focusing operation is generated.

Moreover, inside the digital camera 100, a driving signal is transmitted to the lens group driving sections 103 and 104 for carrying out a zooming and focusing operations based on a signal from a zooming and focusing operation section 110 such as a zoom operating lever and a focusing button which are positioned on an exterior of the digital camera 100. At the same time, it is electrically connected to a zooming and focusing instruction and storage section 109 which holds information related to the zooming and focusing operations.

Moreover, the zooming and focusing instruction and storage section 109 is also connected electrically to the signal processing section 120, and receives a focusing operation signal based on a detection of contrast in the signal processing section 120, and an instruction for the focusing operation mentioned above is given.

Moreover, the digital camera 100 includes a photography-mode operating section 113 which transmits to the camera that it is an underwater photography. When the user has carried out a setting intended for the underwater photography in the photography mode, an instruction to change to an image restoring appropriate for the underwater photography is given to an image restoring section 107.

Moreover, an underwater detection sensor 114 is provided in the main body of the digital camera 100. Even in a case in which the underwater photography is not intended as the photography mode, when the digital camera main body is identified to be in the underwater environment, the underwater detection sensor 114 gives an instruction to the image restoring section 107 to carry out the image restoration for the underwater photography.

Moreover, after the underwater detection sensor 114 has carried out the measurement of pressure, when the pressure is higher than a certain pressure, the image restoration for the underwater environment photography may be carried out. Or, when the underwater detection sensor 114 has detected a passing of electricity or a change in an electric current when it has come in contact with a liquid, the image restoration for the underwater environment photography may be carried out. Or, upon detecting a state of mounting of the underwater housing by the underwater detection sensor 114, when the underwater housing is mounted, the image restoration as (for) the underwater environment photography may be carried out.

Moreover, inside the main body of the digital camera 100, there is provided an information holding section 111 which holds a data table of coefficients for carrying out different distortion correction for each of R, G, and B signals, according to a focal length of the zoom lens system, a focusing state, an instruction for the photography mode, and an instruction of the underwater detection. In this example, the information holding section 111 holds coefficient data which is approximated to the distortion assigned as shown in the following table 1 conceptually.

In table 1, FFL denotes In-focus focal length, OL denotes On land, UW denotes Underwater, COE denotes coefficient.

TABLE 1

| FL | | COE | FFL a to b | | | COE | FFL b to c | | |
|---|---|---|---|---|---|---|---|---|---|
| | | | A | B | C | | A | B | C |
| A~B | OL | R | AR111 | BR111 | CR111 | OL | R | AR211 | BR211 | CR211 |
| | | G | AG111 | BG111 | CG111 | | G | AG211 | BG211 | CG211 |
| | | B | AB111 | BB111 | CB111 | | B | AB211 | BB211 | CB211 |
| | UW | R | AR112 | BR112 | CR112 | UW | R | AR212 | BR212 | CR212 |
| | | G | AG112 | BG112 | CG112 | | G | AG212 | BG212 | CG212 |
| | | B | AB112 | BB112 | CB112 | | B | AB212 | BB212 | CB212 |
| B~C | OL | R | AR121 | BR121 | CR121 | OL | R | AR221 | BR221 | CR221 |
| | | G | AG121 | BG121 | CG121 | | G | AG221 | BG221 | CG221 |
| | | B | AB121 | BB121 | CB121 | | B | AB221 | BB221 | CB221 |
| | UW | R | AR122 | BR122 | CR122 | UW | R | AR222 | BR222 | CR222 |
| | | G | AG122 | BG122 | CG122 | | G | AG222 | BG222 | CG222 |
| | | B | AB122 | BB122 | CB122 | | B | AB222 | BB222 | CB222 |
| C~D | OL | R | AR131 | BR131 | CR131 | OL | R | AR231 | BR231 | CR231 |
| | | G | AG131 | BG131 | CG131 | | G | AG231 | BG231 | CG231 |
| | | B | AB131 | BB131 | CB131 | | B | AB231 | BB231 | CB231 |
| | UW | R | AR132 | BR132 | CR132 | UW | R | AR232 | BR232 | CR232 |
| | | G | AG132 | BG132 | CG132 | | G | AG232 | BG232 | CG232 |
| | | B | AB132 | BB132 | CB132 | | B | AB232 | BB232 | CB232 |
| D~E | OL | R | AR141 | BR141 | CR141 | OL | R | AR241 | BR241 | CR241 |
| | | G | AG141 | BG141 | CG141 | | G | AG241 | BG241 | CG241 |
| | | B | AB141 | BB141 | CB141 | | B | AB241 | BB241 | CB241 |
| | UW | R | AR142 | BR142 | CR142 | UW | R | AR242 | BR242 | CR242 |
| | | G | AG142 | BG142 | CG142 | | G | AG242 | BG242 | CG242 |
| | | B | AB142 | BB142 | CB142 | | B | AB242 | BB242 | CB242 |

As a matter of course, the data may be held upon classifying the zooming states and the focusing states in further detail. Here, the coefficient data is let to be items of a third order, a fifth order, and a seventh order. However, the number of coefficients may be reduced. Moreover, the number of coefficients may be increased as well. Moreover, an arrangement may be made such that the optimum coefficient is obtained by calculation from a correlation of a plurality of coefficients which are held, according to the focal length and the in-focus focal length.

The information holding section 111 transmits to the image restoring section 107 of the signal processing section 120, information of distortion of B, G, and R according to the corresponding focal length, focused focal length, and photography state, based on the information in the zooming and focusing instruction and storage section 109, the photography-mode operating section 113, and the underwater detection sensor 114.

The signal processing section 120 includes the image restoring section 107, and upon letting data of image picked up by the CCD and image data which is subjected to pre-processing such as gamma correction, to be original data, carries out correction of distortion for each of the R, G, and B colors by using the abovementioned coefficients. Processes such as a brightness adjustment and a color adjustment are added after correcting the aberration electrically.

Moreover, an acceleration sensor may be provided in the digital camera 100, and a process which corrects electrically the deterioration of an image due to blurring may be carried out.

The image signal subjected to the image restoration is transmitted to a liquid crystal monitor 108 which is disposed on a rear surface of the apparatus, and is displayed as a visible image. Moreover, the image data is transmitted to a recording medium 112 which is either integrated with the digital camera 100 (apparatus) or detachable from the digital camera 100, and the image data, after being restored, can be recorded in the recording medium 112.

A zoom lens system which is designed suitably for the digital camera 100 (electronic image pickup apparatus) having such structure will be exemplified below. According to the zoom lens system, since the barrel distortion at the wide angle side in the on-land photography state is substantial, mainly this barrel distortion is corrected. Since the distortion and the chromatic aberration of magnification are suppressed at the telephoto end, instead of correcting the distortion and the chromatic aberration of magnification, the load of image processing is reduced.

In the underwater photography state, the distortion is suppressed, but since an effect of the chromatic aberration of magnification is substantial, the chromatic aberration of magnification is corrected electrically. As a matter of course, an image processing which reduces an effect of a spherical aberration and a coma aberration may also be carried out.

In two zoom lens systems which will be exemplified below, since the electrical correction of the distortion and the chromatic aberration of magnification in the on-land photography and a photography at the telephoto end at the time of infinite object point focusing is not carried out, an effective image pickup area in this photography state has the widest light receiving area. Consequently, Ih becomes half the diagonal length of the effective image pickup area in this state.

An upper end of an aberration diagram showing an amount of occurrence of astigmatism, distortion, and chromatic aberration of magnification in the zoom lens system of each embodiment corresponds to a position at which the image height is Ih. The first embodiment, as shown in FIG. 2, is an embodiment in which a waterproof function is imparted to the digital camera 100.

Therefore, at the time of both the on-land photography and the underwater photography, a plane parallel plate is provided between an object and the zoom lens system. In the on-land photography, there is air between the object to be photographed and the plane parallel plate, and in the underwater photography, there is water (such as sea water) between the object and the plane parallel plate. Moreover, in a cross-sectional view, a reflecting surface of a prism in a first lens unit G1 is omitted, and an optical path is showed in an enlarged form. Furthermore, a cover glass C which is a plane parallel plate protecting the zoom lens system from an external environment is provided.

The zoom lens system of the embodiments, includes, in order from an object side thereof, a first lens unit having a positive refracting power, which is fixed at the time of zooming, a second lens unit having a negative refracting power, which moves toward an image side at the time of zooming from the wide angle end to the telephoto end, an aperture stop which is fixed in an optical axis direction at the time of zooming, a third lens unit having a positive refracting power, which moves toward the object side at the time of zooming from the wide angle end to the telephoto end, and a fourth lens unit having a positive refracting power, which moves for adjusting an image position at the time of zooming and at the time of focusing.

A CCD cover glass and a low pass filter on which an infrared rays cutting coating is applied are disposed at the image side of the zoom lens system, and an image is formed on a light receiving surface of the CCD.

The embodiments of the zoom lens system of the present invention will be described below in detail by referring to the accompanying diagrams. However, the present invention is not restricted to the embodiments described below.

Figure 4A:
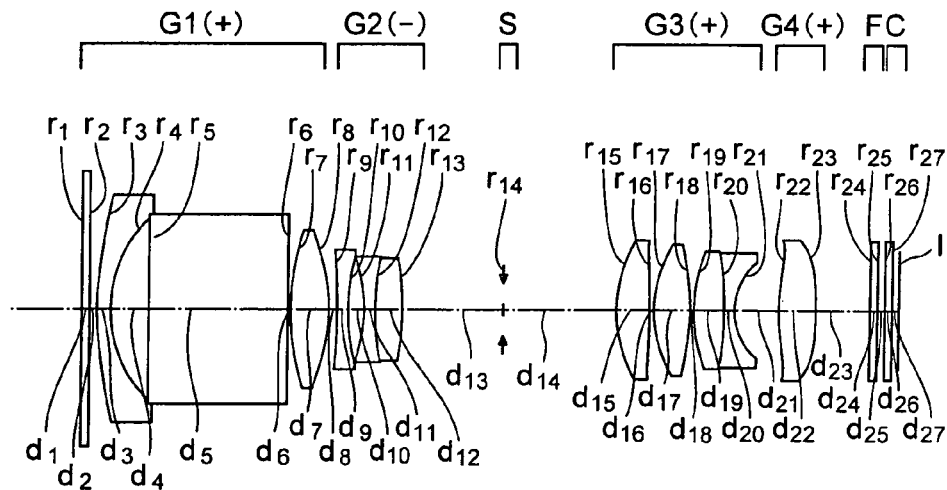
FIG. 4A, FIG. 4B, and FIG. 4C are cross-sectional views along an optical axis showing an optical arrangement at the time of infinite object point focusing of a zoom lens system according to the first embodiment, where.
Figure 4B:
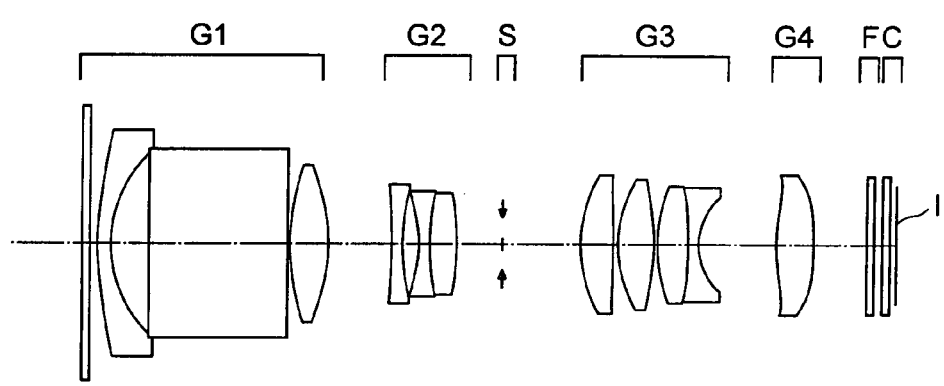
Figure 4C:
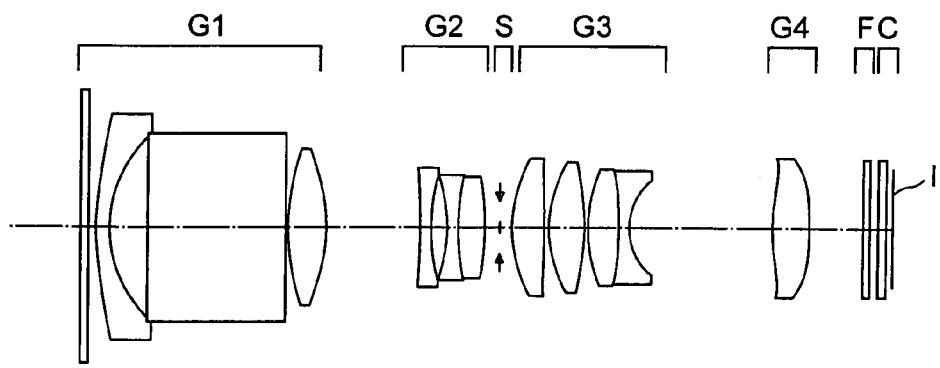

A zoom lens system in the first embodiment will be described below. FIG. 4A, FIG. 4B, and FIG. 4C show cross-sectional views along an optical axis of an optical arrangement at the time of infinite object point focusing for the on-land photography (an arrangement of lens cross-sectional surfaces is same for the underwater photography) of the zoom lens system according to the first embodiment, where, FIG. 4A shows a state at the wide angle end, FIG. 4B shows an intermediate zoom state, and FIG. 4C shows a state at the telephoto end. In FIG. 4A to FIG. 4C, G1 denotes a first lens unit, G2 denotes a second lens unit, S denotes an aperture stop, G3 denotes a third lens unit, G4 denotes a fourth lens unit, F denotes a plane parallel plate which forms a low pass filter in which, a wavelength region restricting coating which restricts infrared light is applied, C denotes a plane parallel plate of carbon glass of an electronic image pickup element, and I denotes an image plane. A multilayered film for restricting a wavelength region may be applied to a surface of the carbon glass C. Moreover, the carbon glass C may be let to have a low pass filter effect.

The zoom lens system in the first embodiment, as shown in FIG. 4A to FIG. 4C, includes, in order from an object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward the image side, the aperture stop S is fixed, the third lens unit G3 moves toward the object side, and the fourth lens unit G4 is fixed.

In order from the object side, the first lens unit G1 includes a plane parallel plate, a first negative meniscus lens having a convex surface directed toward the object side, a second prism, and a third biconvex positive lens. The second lens unit G2 includes a fourth biconcave negative lens, a fifth biconcave negative lens, and a sixth biconvex positive lens. The fifth biconcave negative lens and the sixth biconvex positive lens are cemented. The third lens unit G3 includes a seventh biconvex positive lens, an eighth biconvex positive lens, a ninth biconvex positive lens, and a tenth biconcave negative lens. The ninth biconvex positive lens and the tenth biconcave negative lens are cemented. The fourth lens unit G4 includes an eleventh biconvex positive lens.

An aspheric surface is used for six surfaces namely, both surfaces of the third biconvex positive lens, both surfaces of the seventh biconvex positive lens, and both surfaces of the eleventh biconvex positive lens.

Numerical data of each embodiment described above is shown below. Apart from symbols described above, f denotes a focal length of the entire zoom lens system, BF denotes a back focus, each of $f_1$, $f_2$, ... denotes a focal length of each lens unit, Im denotes an image height, $F_{NO}$ denotes an F number, ω denotes a half image angle, WE denotes a wide angle end, ST denotes an intermediate state, TE denotes a telephoto end, each of $r_1$, $r_2$, ... denotes a radius of curvature of each lens surface, each of $d_1$, $d_2$, ... denotes a distance between two lenses, each of $n_{d1}$, $n_{d2}$, ... denotes a refractive index of each lens for a d-line, and each of $v_{d1}$, $v_{d2}$, ... denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane. Moreover, the half image angle changes according to the on-land photography and the underwater photography, even when the image height is let to be constant. Furthermore, the image height changes according to a method of correcting electrically the distortion in each zoom state.

In the first embodiment, when the barrel distortion occurs, an arrangement is made such that an image is not missing in a short-side direction which passes through a center of the effective image pickup area, and it is assumed that the distortion due to the lens system is almost cancelled by the image processing. Therefore, in a state of the barrel distortion occurred in the lens system, the image height is a value smaller than half of a diagonal length of the effective image pickup area (Ih).

Whereas, when the pin-cushion distortion occurs, an arrangement is made such that an image in a diagonal direction of the effective image pickup area is not missing, and it is assumed that the distortion due to the lens system is completely cancelled by the image processing. In this case, the image height is a value same as half of the diagonal length of the effective image pickup area.

Im is an image height when the diagonal length of the effective image pickup area becomes maximum, and is equivalent to half of the diagonal length of the effective image pickup area.

ω is a half image angle when the image height is let to be Im.

$Im_L$ is an image height for the on-land photography when the correction of distortion is assumed when the distortion is assumed to be corrected. $ω_L$ is a half image angle when the image height for the on-land photography is let to be $Im_L$.

$Im_{UW}$ is an image height for the underwater photography when the distortion is assumed to be corrected. $ω^{UW}$ is a half image angle when the image height for the underwater photography is let to be $Im_{UW}$.

Each aberration diagram is an aberration diagram only according to an optical system, and the astigmatism, the distortion, and the chromatic aberration of magnification are output with the image angle ω corresponding to the image height Im equivalent to the half of the diagonal length of the effective image pickup area (Ih), as an upper end.

Each of the numerical data is a data for a state when an infinite object is focused. A unit of length for each value is mm, and a unit of angle is degree (°)

When x is let to be an optical axis with a direction of traveling of light as a positive direction, and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4, A_6, A_8, A_{10}$, and $A_{12}$ denote aspherical-surface coefficients of a fourth order, a sixth order, an eight order, a tenth order, and a twelfth order respectively. Moreover, in the aspherical surface coefficients, 'e-n'('e$^{-n}$') (where, n is an integral number) indicates '10$^{-n}$',

EXAMPLE 1

| | | | |
|---|---|---|---|
| $r_1 = \infty$ | $d_1 = 0.50$ | $n_{d1} = 1.51633$ | $\nu_{d1} = 64.14$ |
| $r_2 = \infty$ | $d_2 = 0.50$ | | |
| $r_3 = 33.155$ | $d_3 = 0.80$ | $n_{d2} = 1.98000$ | $\nu_{d2} = 23.90$ |
| $r_4 = 8.765$ | $d_4 = 2.83$ | | |
| $r_5 = \infty$ | $d_5 = 9.00$ | $n_{d3} = 1.83400$ | $\nu_{d3} = 37.16$ |
| $r_6 = \infty$ | $d_6 = 0.20$ | | |
| $r_7 = 15.823$ (A) | $d_7 = 2.56$ | $n_{d4} = 1.71788$ | $\nu_{d4} = 55.40$ |
| $r_8 = -13.703$ (A) | $d_8 = $ (Variable) | | |
| $r_9 = -49.582$ | $d_9 = 0.70$ | $n_{d5} = 1.88300$ | $\nu_{d5} = 40.76$ |
| $r_{10} = 14.876$ | $d_{10} = 1.15$ | | |
| $r_{11} = -9.382$ | $d_{11} = 0.70$ | $n_{d6} = 1.88300$ | $\nu_{d6} = 40.76$ |
| $r_{12} = 19.484$ | $d_{12} = 1.80$ | $n_{d7} = 1.92286$ | $\nu_{d7} = 20.88$ |
| $r_{13} = -19.306$ | $d_{13} = $ (Variable) | | |
| $r_{14} = \infty$ (S) | $d_{14} = $ (Variable) | | |
| $r_{15} = 9.011$ (A) | $d_{15} = 2.25$ | $n_{d8} = 1.61680$ | $\nu_{d8} = 59.68$ |
| $r_{16} = -48.402$ (A) | $d_{16} = 0.20$ | | |
| $r_{17} = 9.335$ | $d_{17} = 2.28$ | $n_{d9} = 1.49895$ | $\nu_{d9} = 81.11$ |
| $r_{18} = -26.130$ | $d_{18} = 0.38$ | | |
| $r_{19} = 12.676$ | $d_{19} = 2.05$ | $n_{d10} = 1.50693$ | $\nu_{d10} = 79.22$ |
| $r_{20} = -21.026$ | $d_{20} = 0.70$ | $n_{d11} = 1.88500$ | $\nu_{d11} = 25.70$ |
| $r_{21} = 4.519$ | $d_{21} = $ (Variable) | | |
| $r_{22} = 16.046$ (A) | $d_{22} = 2.50$ | $n_{d12} = 1.48862$ | $\nu_{d12} = 72.03$ |
| $r_{23} = -16.192$ (A) | $d_{23} = $ (Variable) | | |
| $r_{24} = \infty$ | $d_{24} = 0.50$ | $n_{d13} = 1.54771$ | $\nu_{d13} = 62.84$ |
| $r_{25} = \infty$ | $d_{25} = 0.50$ | | |
| $r_{26} = \infty$ | $d_{26} = 0.50$ | $n_{d14} = 1.51633$ | $\nu_{d14} = 64.14$ |
| $r_{27} = \infty$ | $d_{27} = 0.40$ | | |
| $r_{28} = \infty$ | | | |
| (Light receiving surface of electronic image pickup apparatus, image plane) | | | |

Aspherical coefficients

7th surface

K = 0.000
$A_4 = -1.11031e{-}04$
$A_6 = 2.64619e{-}06$
$A_8 = 3.25997e{-}08$
$A_{10} = -1.69342e{-}09$

8th surface

K = 0.000
$A_4 = -3.76191e{-}06$
$A_6 = 4.98938e{-}06$
$A_8 = -5.97314e{-}08$
$A_{10} = -4.72190e{-}10$

15th surface

K = 0.000
$A_4 = -1.39053e{-}04$
$A_6 = 2.90971e{-}06$
$A_8 = 3.06185e{-}07$
$A_{10} = -1.60871e{-}08$

-continued

16th surface

K = 0.000
$A_4 = 2.29605e{-}04$
$A_6 = 8.72514e{-}06$
$A_8 = -1.19586e{-}07$

22th surface

K = 0.000
$A_4 = 8.96710e{-}05$
$A_6 = -4.44501e{-}05$
$A_8 = 2.10020e{-}06$
$A_{10} = -1.17105e{-}07$

23th surface

K = 0.000
$A_4 = 1.21501e{-}05$
$A_6 = -3.42471e{-}05$
$A_8 = 1.14648e{-}06$
$A_{10} = -7.02379e{-}08$

Zoom data (∞)

| | WE | ST | TE |
|---|---|---|---|
| f (mm) | 5.07 | 9.36 | 17.42 |
| $F_{NO}$ | 3.57 | 4.27 | 5.10 |
| $d_8$ | 0.50 | 4.14 | 6.08 |
| $d_{13}$ | 6.86 | 3.22 | 1.28 |
| $d_{14}$ | 7.52 | 5.19 | 0.72 |
| $d_{21}$ | 3.02 | 5.36 | 9.82 |
| $d_{23}$ | 3.51 | 3.51 | 3.50 |
| Lens total length | 53.1 | 53.1 | 53.1 |
| BF | 5.08 | 5.08 | 5.09 |
| Im = 3.84 | | | |
| ω (°): On-land | 41.06 | 21.79 | 12.18 |
| ω (°): Underwater | 29.52 | 16.17 | 9.11 |
| $Im_L$ | 3.56 | 3.84 | 3.84 |
| $\omega_L$ (°) | 38.65 | 21.79 | 12.18 |
| $Im_{UW}$ | 3.84 | 3.84 | 3.84 |
| $\omega_{UW}$ (°) | 29.52 | 16.17 | 9.11 |

Focal length of each lens unit

| | |
|---|---|
| $f_1$ | 12.655 |
| $f_2$ | -8.715 |
| $f_3$ | 11.208 |
| $f_4$ | 16.925 |
| Zoom ratio | 3.44 |

Figure 6A:
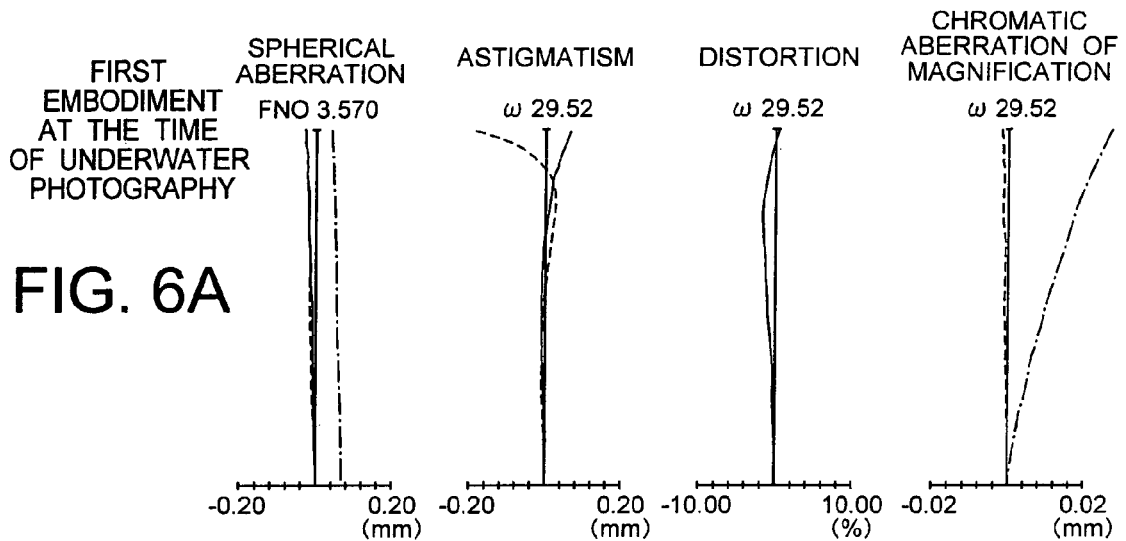
FIG. 6A, FIG. 6B, and FIG. 6C are diagrams showing the spherical aberration, the astigmatism, the distortion, and the chromatic aberration of magnification at the time of the infinite object point focusing, at the time of underwater photography of the first embodiment, where.
Figure 6B:
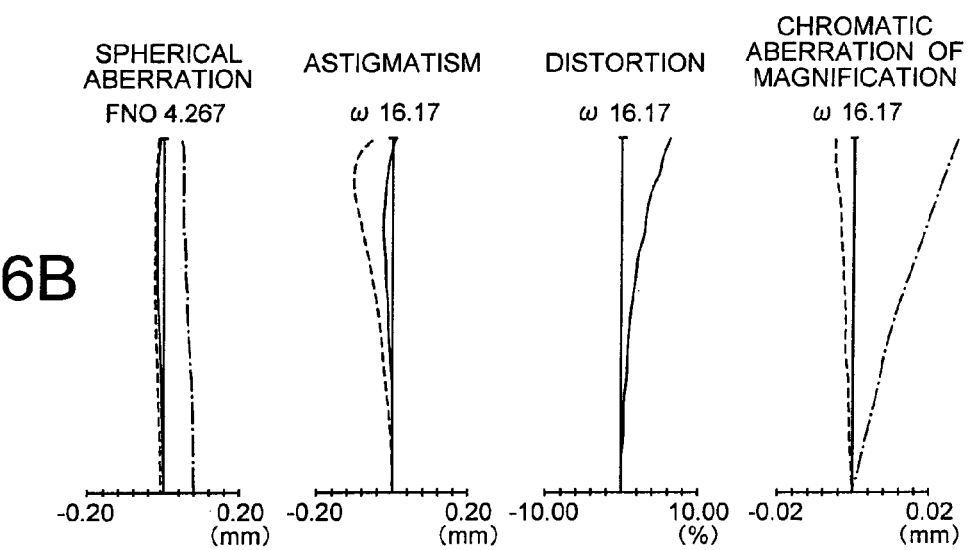
Figure 6C:
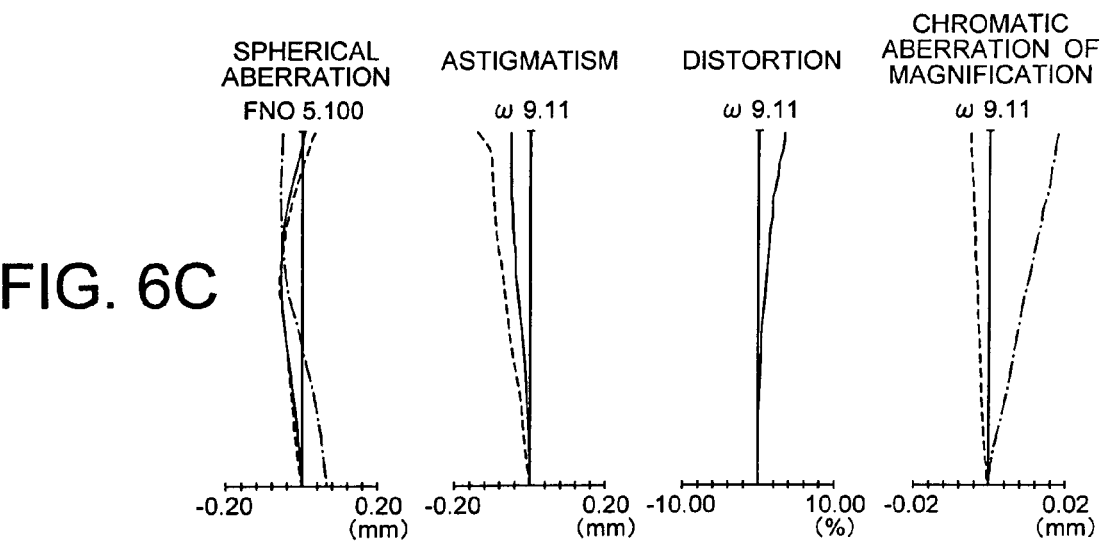

An aberration at the time of the on-line photography in the first embodiment is shown in FIG. 5A, FIG. 5B, and FIG. 5C, and an aberration at the time of the underwater photography in the first embodiment is shown in FIG. 6A, FIG. 6B, and FIG. 6C. FIG. 5A and FIG. 6A show the spherical aberration, the astigmatism, the distortion, and the chromatic aberration of magnification at the wide angle end. FIG. 5B and FIG. 6B show the spherical aberration, the astigmatism, the distortion, and the chromatic aberration of magnification at the intermediate state. FIG. 5C and FIG. 6C show the spherical aberration, the astigmatism, the distortion, and the chromatic aberration of magnification at the telephoto end. In each diagram, 'ω' denotes a half image angle.

[Second embodiment]

Next, a digital camera 200 according to the second embodiment of the present invention will be described below. A zoom lens system in the second embodiment is an example of a zoom lens system which is suitable for a type of a camera in which, the lens is accommodated inside the camera body when the camera is not in use.

In a case of such structure, it is difficult to let a camera to be a camera for both on-land and underwater use. Therefore, in the second embodiment, the zoom lens system is designed assuming that the camera main body is accommodated inside the underwater housing for the underwater photography.

Figure 7:
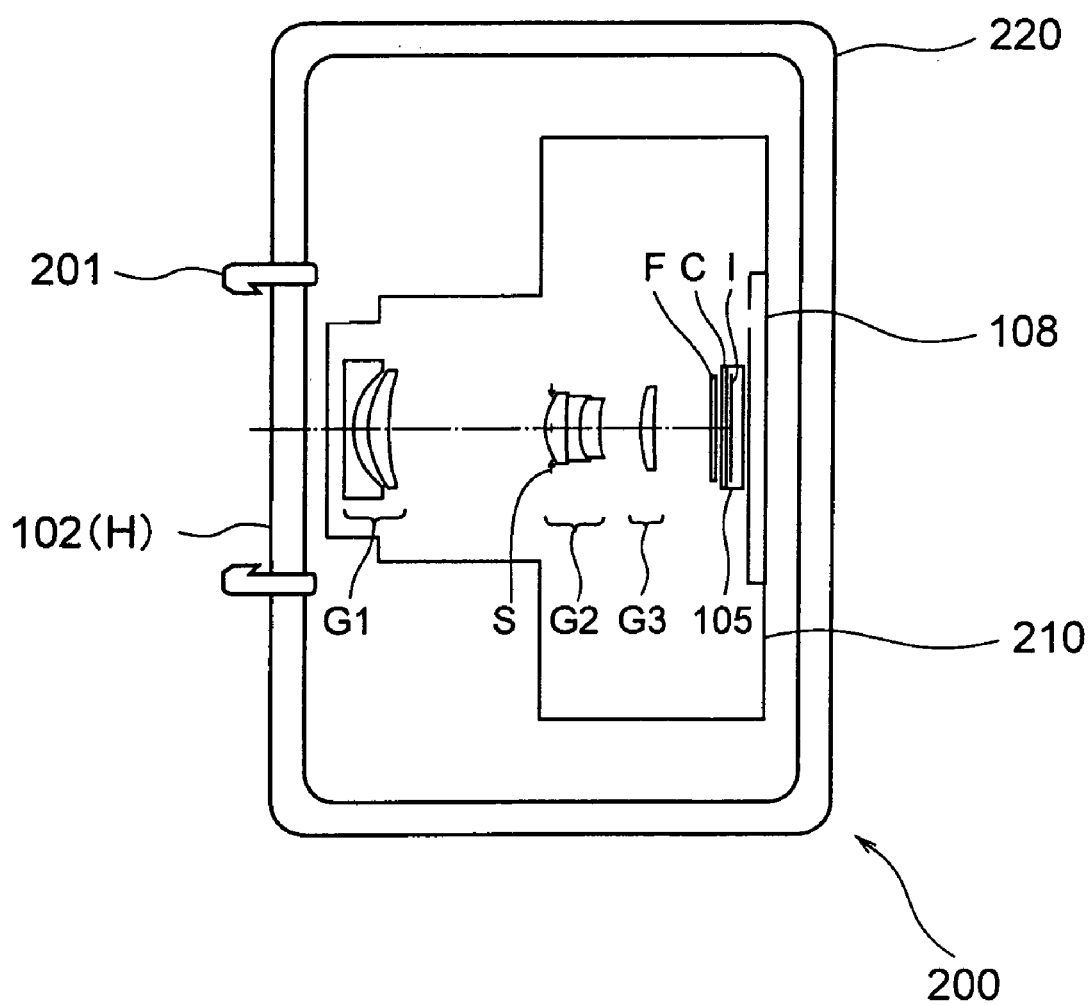
FIG. 7 is a diagram showing a schematic structure of a digital camera according to a second embodiment of the present invention.

FIG. 7 is a diagram showing a schematic structure of the digital camera 200 according to the second embodiment accommodated inside an underwater housing 220. A digital camera main body 210 is accommodated inside the underwater housing 220. The entrance window 102 is formed on an object side of the underwater housing 220. The entrance window 102 corresponds to a plane parallel plate H nearest to the object, of the zoom lens system which will be described later. A user is capable of observing the object by the liquid crystal monitor 108 even when the digital camera 200 is accommodated inside the underwater housing 220.

Moreover, a mounting section 201 may be provided on an outer side of the entrance window 102 of the digital camera main body 210 and the underwater housing 220, and a dome shaped entrance window may be let to be detachably provided to the mounting section 201. By making an attachment of the dome-shaped entrance window to be installable, it is possible to widen an image angle at the time of the underwater photography.

Moreover, an attachment lens such as an attachment lens which widens the image angle and an attachment lens for a short-distance photography may be let to be installable on the outer side of entrance window 102 of the digital camera main body 210 and the underwater housing 220.

For making it possible to carry out the appropriate electrical correction according to a change in aberration when such attachment is mounted, it is preferable that the digital camera 200 includes an operating section which enables to input information about whether or not these attachments are mounted on the camera main body, and a correction section which includes data for aberration correction according to the information which is input, and which carries out electrical correction also of the fluctuation in the aberration according to a presence or absence of the attachment, and that an arrangement is made such that it is possible to carry out the electrical correction of various aberrations.

Figure 8A:
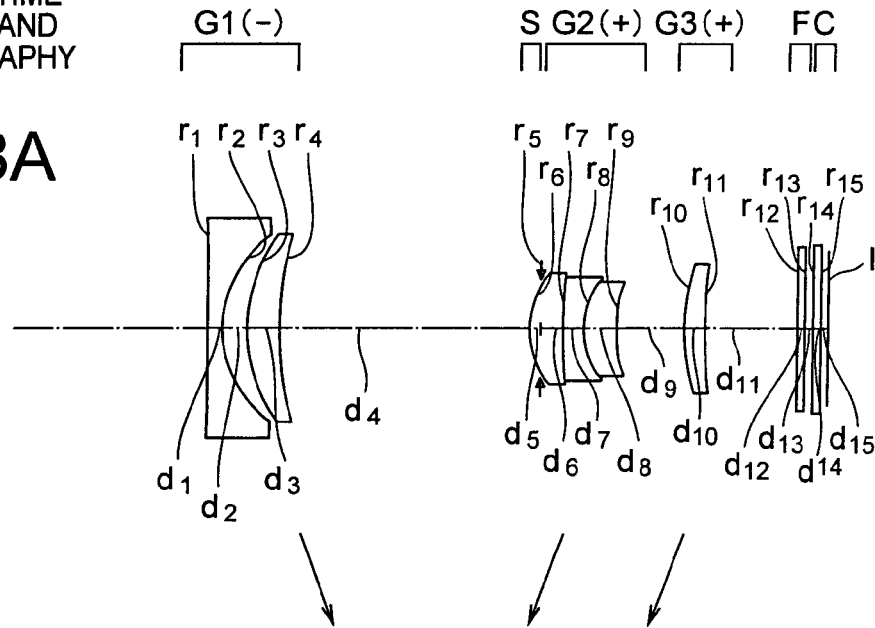
FIG. 8A, FIG. 8B, and FIG. 8C are cross-sectional views along the optical axis showing an optical arrangement at the time of infinite object point focusing, at the time of on-land photography, of a zoom lens system according to the second embodiment, where.
Figure 8B:
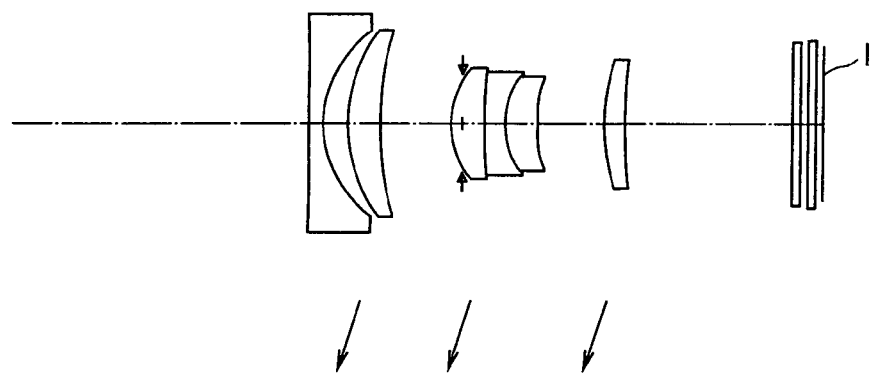
Figure 8C:
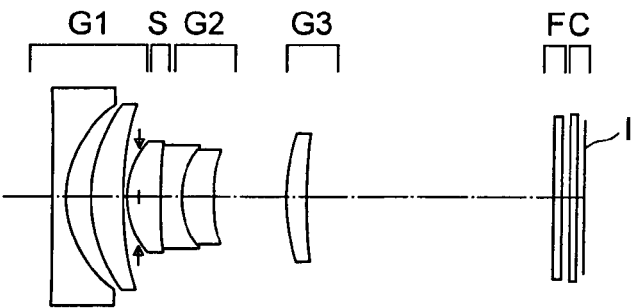
Figure 9A:
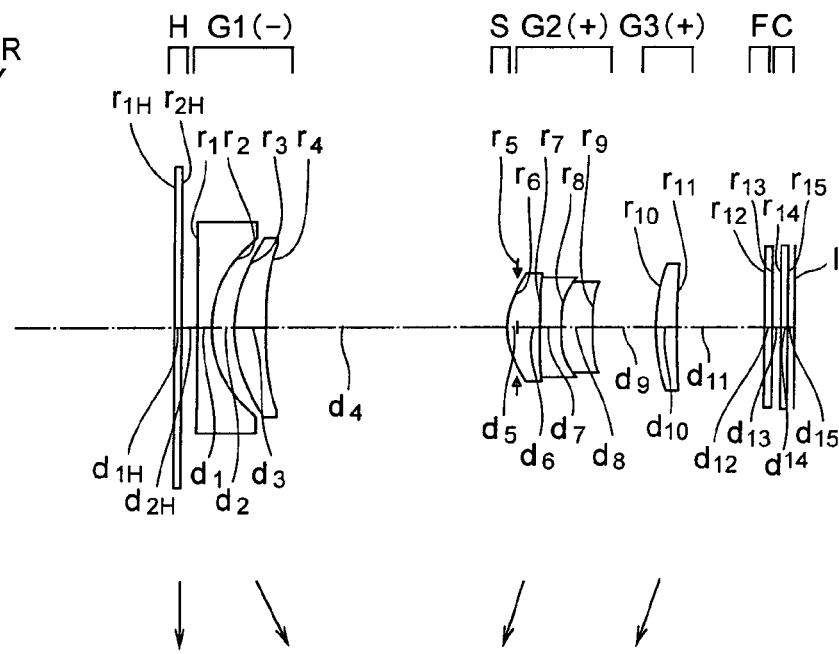
FIG. 9A, FIG. 9B, and FIG. 9C are cross-sectional views along the optical axis showing an optical arrangement at the time of infinite object point focusing, at the time of underwater photography, of the zoom lens system according to the second embodiment, where.
Figure 9B:
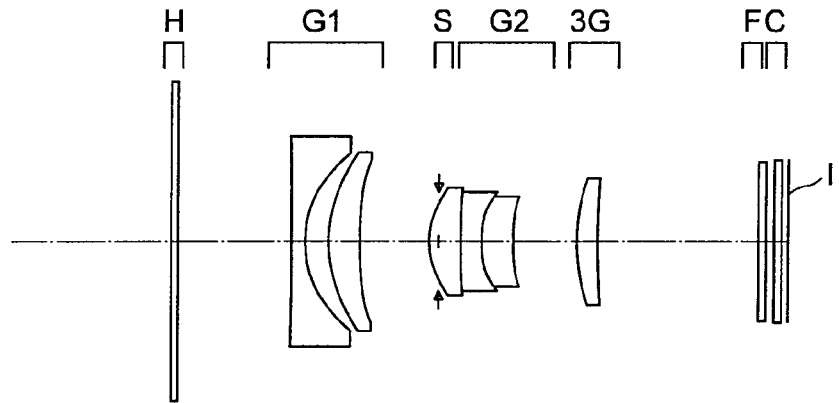
Figure 9C:
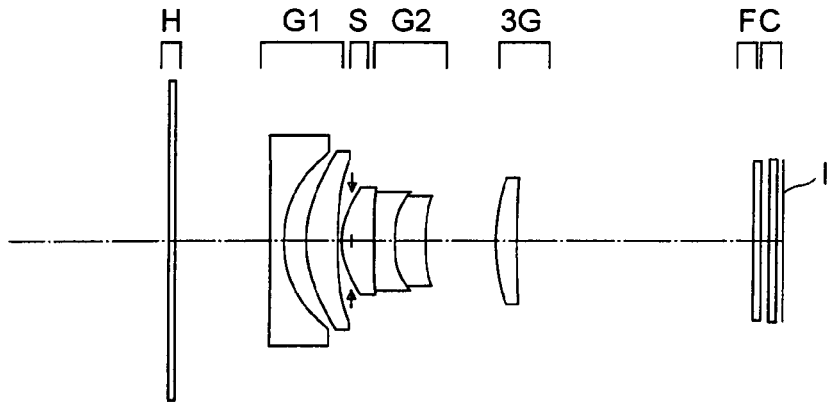

Next, the zoom lens in the second embodiment will be described below. FIG. 8A, FIG. 8B, and FIG. 8C show cross-sectional views along an optical axis of an optical arrangement at the time of the infinite object point focusing for the on-land photography of the zoom lens system according to the second embodiment, where, FIG. 8A shows a state at the wide angle end, FIG. 8B shows an intermediate state, and FIG. 8C shows a state at the telephoto end. FIG. 9A, FIG. 9B, and FIG. 9C show cross-sectional views along an optical axis of an optical arrangement at the time of the infinite object point focusing for the underwater photography of the zoom lens system according to the second embodiment, where, FIG. 9A shows a state at the wide angle end, FIG. 9B shows an intermediate state, and FIG. 9C shows a state at the telephoto end.

The zoom lens system in the second embodiment, includes, in order from an object side thereof, a first lens unit G1 having a negative refracting power, an aperture stop S, a second lens unit G2 having a positive refracting power, and a third lens unit G3 having a positive refracting power.

At the time of zooming from the wide angle end to the telephoto end, the entrance window H is fixed, the first lens unit G1, after moving once toward an image side, is turned over, and moves toward the object side, the second lens unit G2 moves integrally with the aperture stop S toward the object side, and the third lens unit G3 moves toward the object side.

Moreover, the aperture stop S moves integrally with the second lens unit G2, and an vertex of a lens surface on the object side of the second lens unit G2 has entered into an opening of the aperture stop S. The third lens unit G3 moves for adjusting an image position at the time of zooming and at the time of focusing. A locus of movement of each lens unit at the time of zooming is same for both the on-land photography and the underwater photography.

The plane parallel plate H (=entrance window 102) is provided nearest to the object. In order from the object side, the first lens unit G1 includes a first biconcave negative lens, and a second positive meniscus lens having a convex surface directed toward the object side. The second lens unit G2 includes a third positive meniscus lens having a convex surface directed toward the object side, a fourth negative meniscus lens having a convex surface directed toward the object side, and a fifth positive meniscus lens having a convex surface directed toward the object side. The third positive meniscus lens, the fourth negative meniscus lens, and the fifth positive meniscus lens are cemented. The third lens unit G3 includes a sixth positive meniscus lens having a convex surface directed toward the object side.

An aspheric surface is used for six surfaces namely, a surface on the image side of the first biconcave negative lens, a surface on the object side of the third positive meniscus lens, a surface on the image side of the fifth positive meniscus lens, and a surface on the image side of the sixth positive meniscus lens.

Further, a low pass filter having the infrared rays cutting coating applied thereon, and a CCD cover glass are disposed on the image side of the zoom lens system, and an image is formed on a light receiving surface of the CCD. Moreover, at the time of the underwater photography, a cover glass (plane parallel plate H) of a plane parallel plate which forms an entrance window of the housing is disposed on the image side of the zoom lens system. At the time of the underwater photography, a medium on the object side of the cover glass is water (such as sea water).

In the air environment, it is zoom data of the digital camera main body. Moreover, in the underwater environment, a presence and absence of the cover glass of the housing, a distance D (HL) between the cover glass and a surface of incidence of the zoom lens system, and an image angle change. Other values are common.

EXAMPLE 2

Numerical data of underwater housing

| Surface number | r | d | nd | vd |
| --- | --- | --- | --- | --- |
| 1H | ∞ | 0.50 | 1.51633 | 64.14 |
| 2H | ∞ | D(HL) | | |

D (HL) is a variable distance between the housing and the zoom lens system on the camera side;

| Zoom lens data of the camera main body | | | |
| --- | --- | --- | --- |
| $r_1 = -200.434$ | $d_1 = 0.90$ | $n_{d1} = 1.80610$ | $v_{d1} = 40.92$ |
| $r_2 = 6.474$ (A) | $d_2 = 1.53$ | | |
| $r_3 = 9.933$ | $d_3 = 2.02$ | $n_{d2} = 2.00069$ | $v_{d2} = 25.46$ |
| $r_4 = 21.902$ | $d_4 =$ (Variable) | | |
| $r_5 = \infty$ (S) | $d_5 = -0.63$ | | |

-continued

| | | | |
|---|---|---|---|
| $r_6 = 5.753$ (A) | $d_6 = 2.06$ | $n_{d3} = 1.80610$ | $v_{d3} = 40.92$ |
| $r_7 = 35.230$ | $d_7 = 1.27$ | $n_{d4} = 1.84666$ | $v_{d4} = 23.78$ |
| $r_8 = 5.202$ | $d_8 = 2.06$ | $n_{d5} = 1.58313$ | $v_{d5} = 59.38$ |
| $r_9 = 16.552$ (A) | $d_9 =$ (Variable) | | |
| $r_{10} = 14.000$ (A) | $d_{10} = 1.24$ | $n_{d6} = 1.52542$ | $v_{d6} = 55.78$ |
| $r_{11} = 41.056$ | $d_{11} =$ (Variable) | | |
| $r_{12} = \infty$ | $d_{12} = 0.50$ | $n_{d7} = 1.51633$ | $v_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $v_{d8} = 64.14$ |
| $r_{15} = \infty$ | $d_{15} = 0.40$ | | |
| $r_{16} = \infty$ | | | |
| (Light receiving surface of electronic image pickup apparatus, image plane) | | | |

Aspherical coefficients

2nd surface $K = -3.501$
$A_4 = 1.39590e-03$
$A_6 = -2.94154e-05$
$A_8 = 6.73010e-07$
$A_{10} = -7.13429e-09$ 6th surface $K = -2.429$
$A_4 = 1.61259e-03$
$A_6 = -1.94631e-05$
$A_8 = 2.01443e-06$
$A_{10} = -5.44542e-08$ 9th surface $K = -4.333$
$A_4 = 2.27790e-03$
$A_6 = 1.03782e-05$
$A_8 = 2.09837e-05$
$A_{10} = -4.69417e-07$ 10th surface $K = 0.000$
$A_4 = -1.47199e-04$
$A_6 = 5.67379e-06$
$A_8 = 4.82046e-07$
$A_{10} = -1.84788e-08$ Zoom data (∞)

| | WE | ST | TE |
|---|---|---|---|
| f (mm) | 7.51 | 14.38 | 21.64 |
| $F_{NO}$ | 2.88 | 3.78 | 4.75 |
| $d_4$ | 16.35 | 5.11 | 1.03 |
| $d_9$ | 4.20 | 4.23 | 4.65 |
| $d_{11}$ | 5.83 | 10.67 | 15.64 |
| D (HL) | 16.35 | 5.11 | 1.03 |
| Lens total length | 38.42 | 32.04 | 33.29 |
| BF | 7.42 | 12.25 | 17.17 |
| Im = 4.55 | | | |
| ω (°): On-land | 34.67 | 17.91 | 11.95 |
| ω (°): Underwater | 25.26 | 13.34 | 8.93 |
| $Im_L$ | 4.23 | 4.48 | 4.52 |
| $ω_L$ (°) | 32.17 | 17.63 | 11.87 |
| $Im_{UW}$ | 4.44 | 4.55 | 4.55 |
| $ω_{UW}$ (°) | 24.67 | 13.34 | 8.93 |

Focal length of each lens unit

| | |
|---|---|
| $f_1$ | −15.832 |
| $f_2$ | 12.196 |
| $f_3$ | 39.804 |
| Zoom ratio | 2.88 |

Figure 10A:
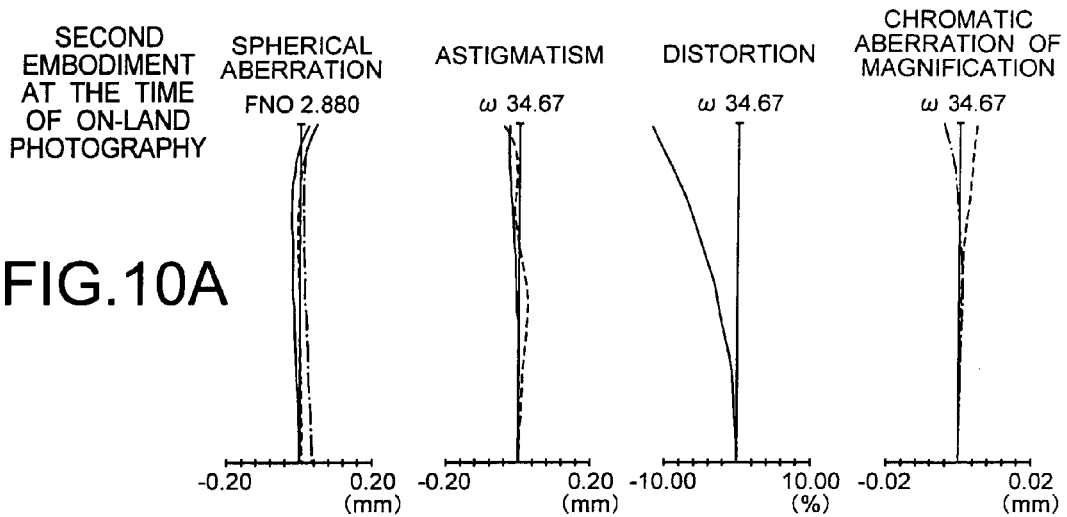
FIG. 10A, FIG. 10B, and FIG. 10C are diagrams showing the spherical aberration, the astigmatism, the distortion, and the chromatic aberration of magnification at the time of the infinite object point focusing, at the time of on-land photography of the second embodiment, where.
Figure 10B:
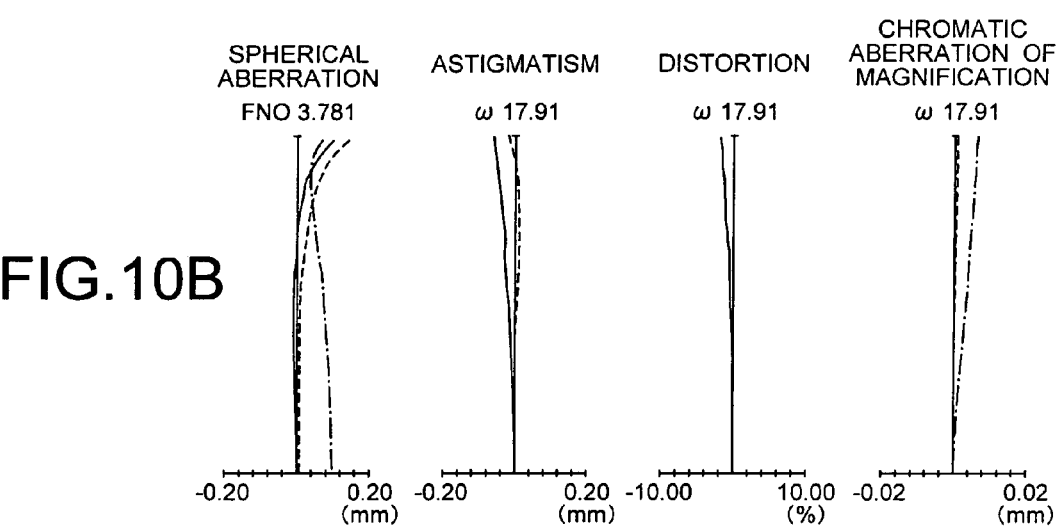
Figure 10C:
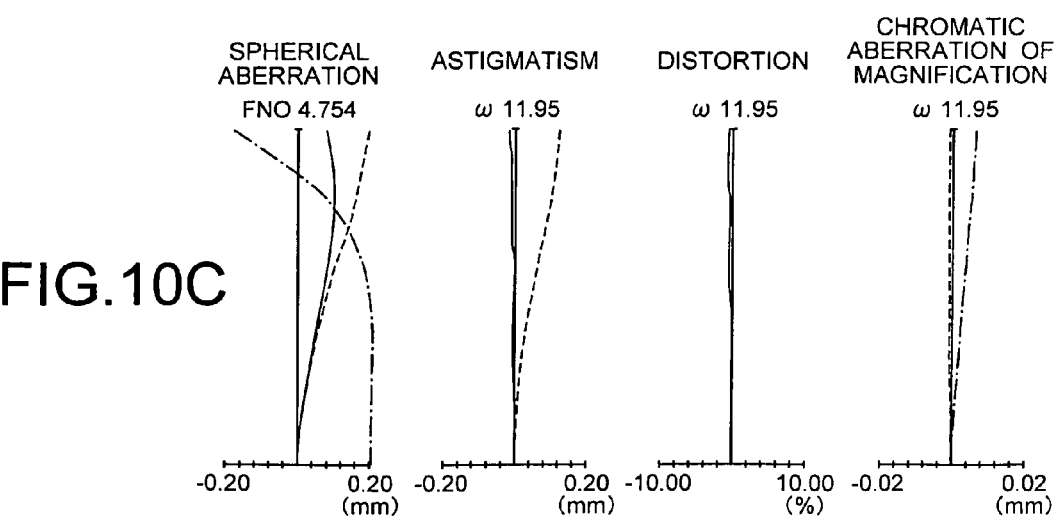
Figure 11A:
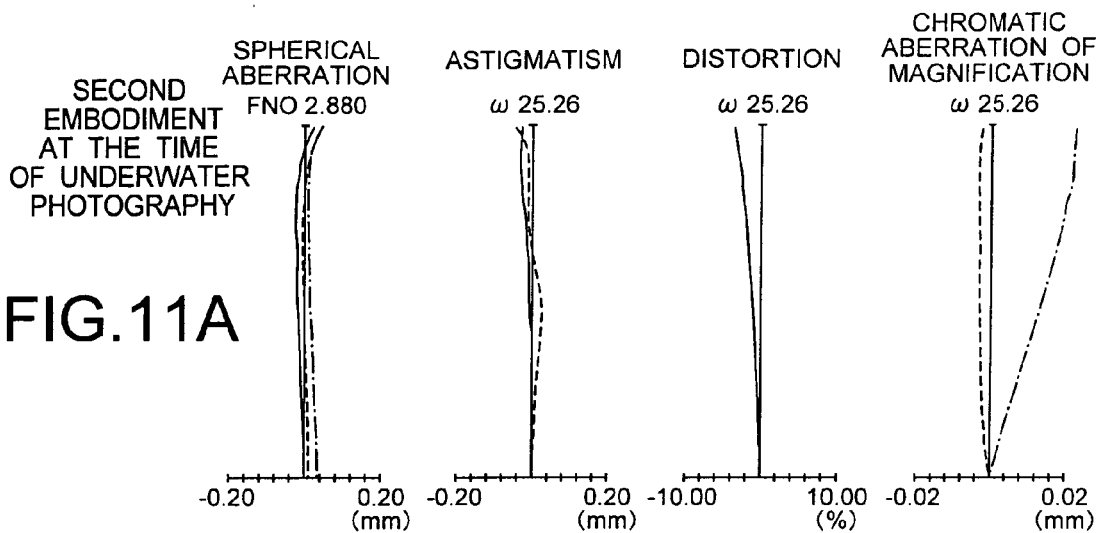
FIG. 11A, FIG. 11B, and FIG. 11C are diagrams showing the spherical aberration, the astigmatism, the distortion, and the chromatic aberration of magnification at the time of the infinite object point focusing, at the time of underwater photography of the second embodiment, where.
Figure 11B:
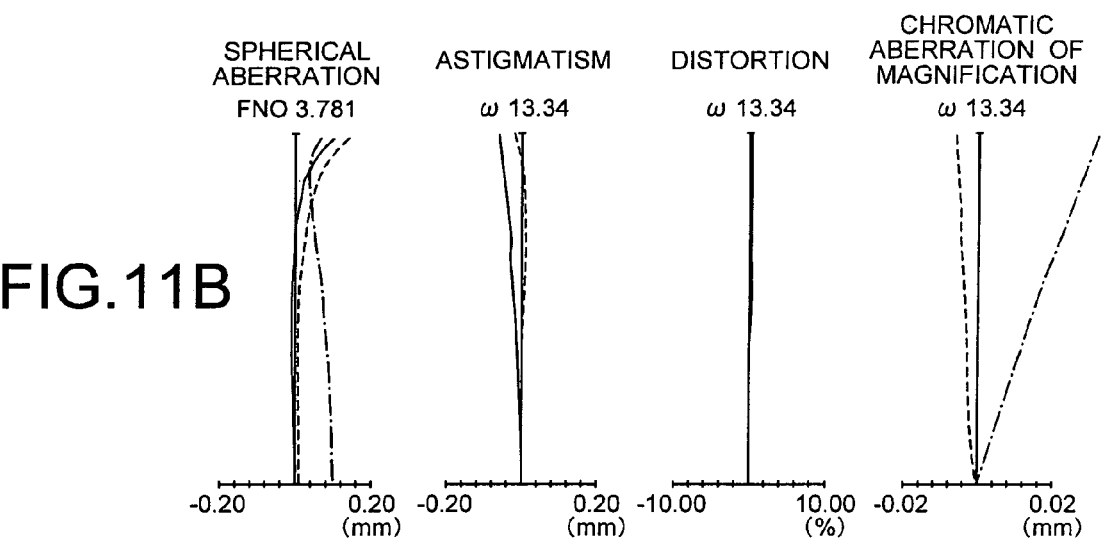
Figure 11C:
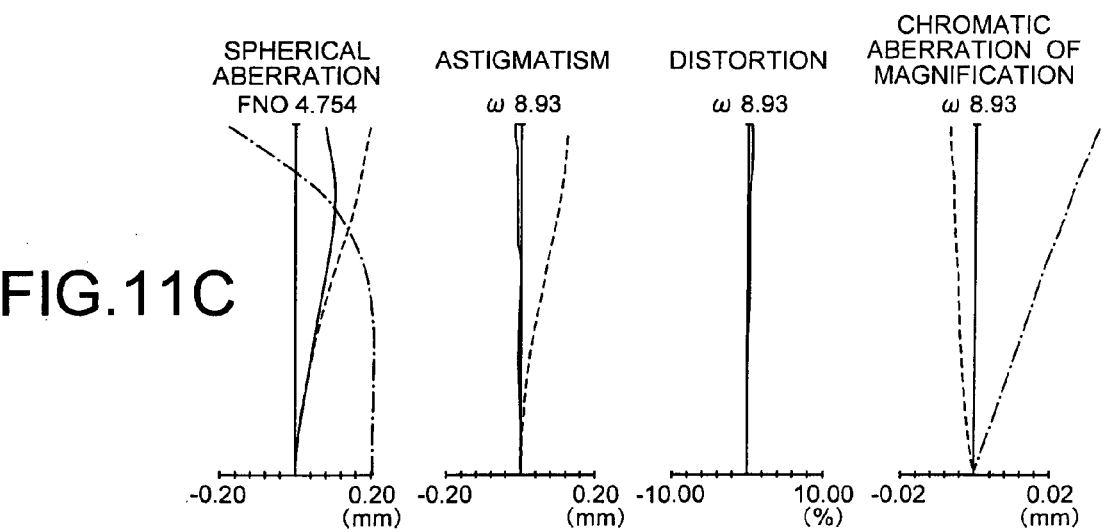
Figure 12:
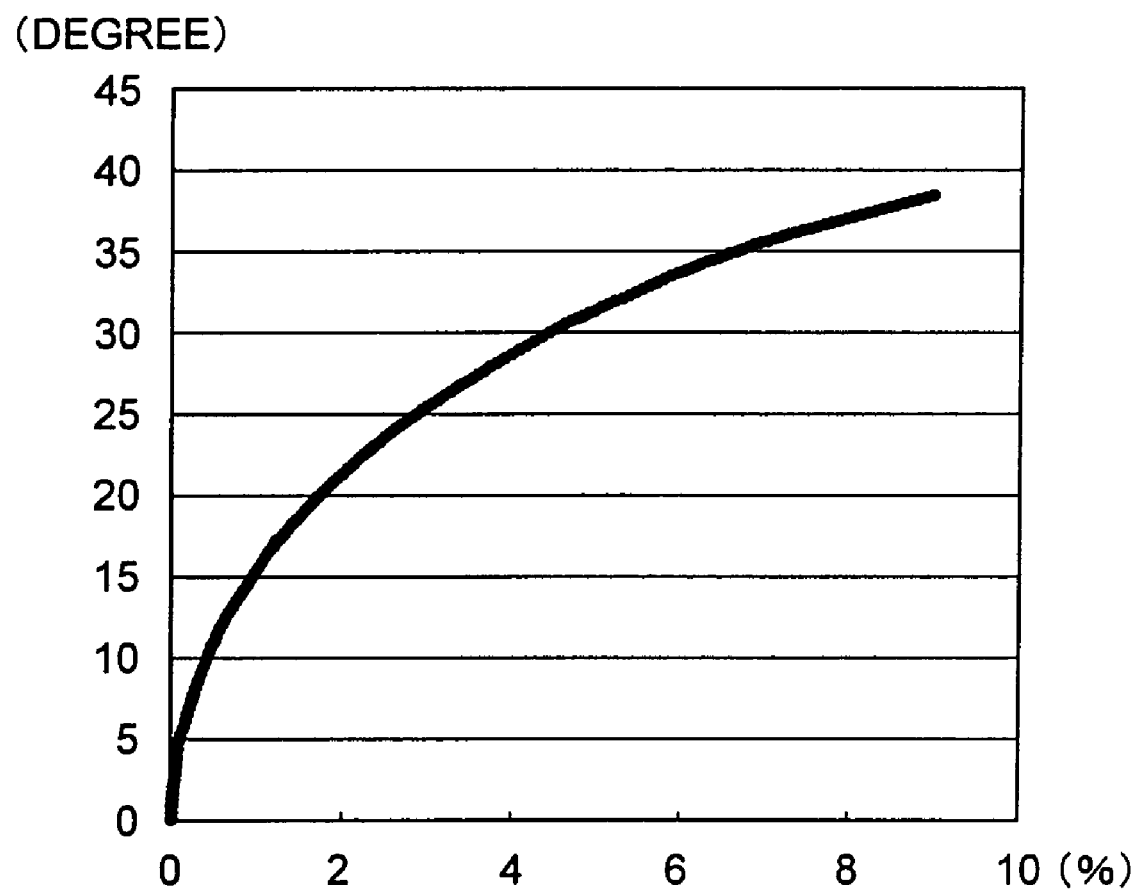
FIG. 12 is a diagram showing a relationship between an amount of distortion occurred, and a half-image angle of incidence at the underwater side.

FIG. 10A, FIG. 10B, and FIG. 10C show aberration diagrams at the time of the on-land photography in the second embodiment, and FIG. 11A, FIG. 11B, and FIG. 11C show aberration diagrams at the time of the underwater photography in the second embodiment.

(Numerical Values Corresponding to Conditional Expressions)

Conditional expression corresponding values and conditional expression factor values of the first embodiment and the second embodiment are given below.

| | fw | Ih | DIS | Ih/$f_w$ |
|---|---|---|---|---|
| Example 1 | 5.07 mm | 3.84 mm | −13.0% | 0.759 |
| Example 2 | 7.51 mm | 4.55 mm | −12.4% | 0.606 |

As it has been described above, the present invention is useful for an electronic image pickup apparatus which is capable of recording an image in which, an effect of an aberration which changes at the time of the on-land photography and at the time of the underwater photography is suppressed, without using a special optical element.

What is claimed is:

1. An electronic image pickup apparatus comprising:
 a taking optical system;
 an image pickup element which is disposed at an image side of the taking optical system, and which converts an image formed by the taking optical system, to an electric signal; and
 an image restoring section which restores electrically a photographed image according to a difference in occurrence of an aberration by the taking optical system in an air environment photography and in a underwater environment photography;
 wherein the aberration includes a distortion;
 wherein the taking optical system is a zoom lens system which satisfies the following conditional expressions $$0.50 < Ih/f_w < 1.50 \quad (A)$$

$$-40\% < DIS < -12\% \quad (B)$$

where,
 $f_w$ denotes a focal length at the time of a wide angle end photography of the taking optical system,
 Ih denotes half of a diagonal length of an effective image pickup area, and
 DIS denotes an amount of distortion in an image height, the image height being a same amount as Ih, at the wide angle end at the time of in air photography.

2. The electronic image pickup apparatus according to claim 1, wherein the aberration includes a chromatic aberration of magnification.

3. The electronic image pickup apparatus according to claim 1, further comprising:
 an operating section in which, a setting of as to whether the electronic image pickup apparatus is in an air environment or in a underwater environment is carried out.

4. The electronic image pickup apparatus according to claim 1, further comprising:
 an operating section in which (on which), a setting of as to whether the electronic image pickup apparatus is in the air environment or in the underwater environment is carried.

5. The electronic image pickup apparatus according to claim 1, further comprising:
 an operating section in which, a setting of as to whether the electronic image pickup apparatus is in the air environment or in the underwater environment is carried.

6. The electronic image pickup apparatus according to claim 2, further comprising:
  an operating section in which, a setting of as to whether the electronic image pickup apparatus is in the air environment or in the underwater environment is carried out.

7. The image pickup apparatus according to claim 3, further comprising:
  an operating section in which, the setting of as to whether the electronic image pickup apparatus is in the air environment or in the underwater environment is carried out.

8. The electronic image pickup apparatus according to claim 1, further comprising:
  a sensor which detects whether the electronic image pickup apparatus is in the air environment or in the underwater environment, wherein
  an image restoration is carried out based on information from the sensor.

9. The electronic image pickup apparatus according to claim 1, wherein a barrel distortion occurs in the air environment, in the taking optical system, and an absolute value of an amount of distortion is higher than an amount of distortion in the underwater environment.

10. The electronic image pickup apparatus according to claim 1, further comprising:
  an information holding section which has data for distortion correction of the taking optical system; and
  a circuit which makes a judgment of a degree of correction of the distortion, based on a signal of a taking photography state and the data.

11. An electronic image pickup apparatus comprising:
  a taking optical system;
  an image pickup element which is disposed at an image side of the taking optical system, and which converts an image formed by the taking optical system, to an electric signal; and
  an image restoring section which restores electrically a photographed image according to a difference in occurrence of an aberration by the taking optical system in an air environment photography and in a underwater environment photography;
  wherein the aberration includes a distortion;
  wherein the taking optical system is a zoom lens system which satisfies the following conditional expressions $0.50 < Ih/f_w < 1.50$ (A)

$-40\% < DIS < -8\%$ (B')

where,
  $f_w$ denotes a focal length at the time of a wide angle end photography of the taking optical system,
  Ih denotes half of a diagonal length of an effective image pickup area, and
  DIS denotes an amount of distortion in an image height, the image height being a same amount as Ih, at the wide angle end at the time of in air photography.

* * * * *